US011134349B1

(12) United States Patent
Nagar et al.

(10) Patent No.: US 11,134,349 B1
(45) Date of Patent: Sep. 28, 2021

(54) HEARING ASSISTANCE DEVICE WITH SMART AUDIO FOCUS CONTROL

(71) Applicant: International Business Machines Corporation, Armonk, NY (US)

(72) Inventors: Raghuveer Prasad Nagar, Kota (IN); Sarbajit K. Rakshit, Kolkata (IN); Manjit Singh Sodhi, Bangalore (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/812,859

(22) Filed: Mar. 9, 2020

(51) Int. Cl.
*H04R 25/00* (2006.01)
*G06F 3/01* (2006.01)

(52) U.S. Cl.
CPC .......... *H04R 25/407* (2013.01); *G06F 3/013* (2013.01); *H04R 25/405* (2013.01); *H04R 25/505* (2013.01); *H04R 25/558* (2013.01); *H04R 25/606* (2013.01); *H04R 2225/43* (2013.01); *H04R 2225/55* (2013.01); *H04R 2460/13* (2013.01)

(58) Field of Classification Search
CPC ........ G02C 7/049; G02C 7/104; G02C 7/105; G02C 7/107; G02C 7/165; G02C 7/04; G02C 11/10; H04R 1/46; H04R 25/606; A61F 2/16

See application file for complete search history.

(56) References Cited

U.S. PATENT DOCUMENTS

| 9,264,824 | B2 | 2/2016 | Pruthi et al. |
| 9,470,910 | B2 | 10/2016 | Fenton et al. |
| 9,820,036 | B1 | 11/2017 | Tritschler et al. |
| 10,025,118 | B1 | 7/2018 | Markus et al. |
| 10,433,078 | B2 | 10/2019 | Cahan et al. |
| 10,547,951 | B2 | 1/2020 | Mansour et al. |
| 2016/0080874 | A1 | 3/2016 | Fullam |
| 2016/0091737 | A1 | 3/2016 | Kim et al. |

(Continued)

FOREIGN PATENT DOCUMENTS

| CN | 104937660 | 9/2015 |
| CN | 107017003 | 8/2017 |

(Continued)

OTHER PUBLICATIONS

Hart et al., The attentive hearing aid: Eye selection of auditory sources for hearing impaired users, IFIP Conference on Human-Computer Interaction, Aug. 2009, pp. 19-35. Springer, Berlin, Heidelberg. dl.ifip.org/db/conf/interact/interact2009-1/HartOSWV09.pdf.

(Continued)

*Primary Examiner* — Amir H Etesam
(74) *Attorney, Agent, or Firm* — Will Stock; Otterstedt, Wallace & Kammer, LLP (57) ABSTRACT

A method includes providing a smart contact lens including an array of beamforming microphones, wherein the smart contact lens is worn by a user and the array of beamforming microphones receive sound from different directions, determining a gaze direction of the user, filter the sound received by the array of beamforming microphones based on the gaze direction of the user to determine filtered sound, and output the filtered sound via a bone conduction hearing device.

19 Claims, 3 Drawing Sheets

(56) References Cited

U.S. PATENT DOCUMENTS

| | | | |
|---|---|---|---|
| 2018/0359572 A1 | 12/2018 | Jensen et al. | |
| 2019/0132685 A1 | 5/2019 | Skoglund et al. | |
| 2019/0174237 A1* | 6/2019 | Lunner | H04R 25/43 |
| 2019/0394606 A1 | 12/2019 | Tammi et al. | |

FOREIGN PATENT DOCUMENTS

| | | |
|---|---|---|
| CN | 109379671 A | 2/2019 |
| EP | 1017253 B1 | 7/2000 |

OTHER PUBLICATIONS

ScienceDaily, Cognitive hearing aid filters out the noise, Aug. 2017, 3 pages https://www.sciencedaily.com/releases/2017/08/17080320492.htm.

Liew Hui Fang et al., Exploring Piezoelectric for Sound Wave as Energy Harvester, Energy Procedia, vol. 105, May 2017, pp. 459-466.

Nick Lavars, Smart contacts: The future of the wearable you wont even see, New Atlas, Nov. 2019, pp. 1-11.

Babak A. Parviz, Augment Reality in a Contact Lens, IEEE Spectrum, Sep. 2009, pp. 1-6., https://spectrum.ieee.org/biomedical/bionics/augmented-reality-in-a-contact-lens.

Carlos H. Morimoto, Detecting Eye Position and Gaze from a Single Camera and 2 Light Sources, IEEE Conference Paper, Jan. 2002, pp. 1-4.

Anup Agarwal, Opportunistic Sensing With MIC Arrays on Smart Speakers for Distal Interaction and Exercise Tracking, IEEE International Conference on Acoustics, Speech and Signal Processing, Apr. 2018, pp. 1-5.

Patent Cooperation Treaty, Notification of Transmittal of the International Search Report and Written Opinion of the International Searching Authority, PCT/IB2021/051858, Jul. 17, 2021, pp. 1-9.

\* cited by examiner

FIG. 1

FIG. 2

HEARING ASSISTANCE DEVICE WITH SMART AUDIO FOCUS CONTROL

BACKGROUND

The present disclosure relates generally to a hearing assistance device, and more particularly to a hearing assistance device with smart audio focus control.

There are many spoken words that create ambiguity to any listener. Typically, the spoken words that create ambiguity have similar sounds that are difficult to distinguish or understand.

In many cases, the listener uses visualization of the lips of a speaker to help to understand or clarify the sound of a spoken word. Even in the case of using visualized cues, the interaction between hearing and vision in speech perception gives rise to the McGurk effect, a perceptual phenomenon or illusion occurs when the auditory component of one sound is paired with the visual component of another sound, leading to the perception of a third sound.

SUMMARY

According to some embodiments of the present invention, a method includes providing a smart contact lens including an array of beamforming microphones, wherein the smart contact lens is worn by a user and the array of beamforming microphones receive sound from different directions, determining a gaze direction of the user, filter the sound received by the array of beamforming microphones based on the gaze direction of the user to determine filtered sound, and output the filtered sound via a bone conduction hearing device.

According to at least one embodiment of the present invention, a system comprises an array of beamforming microphones, a processor in electronic communication with the array of beamforming microphones and configured to determine a direction of sound received by the array of beamforming microphones, determine a focus based on the directions of sound, and output a signal based on the focus, and an audio output device configured to receive the signal output by the processor and to output a filtered audio, the filtered audio preferentially treating certain sounds received by the array of beamforming microphones based on the signal output by the processor.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

a system including a hearing device configured to assist a user to understand sounds from a surrounding environment based on a gaze direction of the user;

a system including a hearing device configured to assist a user to filter sounds from surrounding environment according to predetermined priorities; and a system including visual simulation/augmentation capabilities corresponding to filtered sounds from the environment.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

According to some embodiments, a system is configured to aid a user hearing a sound from the surrounding environment, but may become confused if multiple sounds are coming from different directions of the environment at a same point of time. One or more embodiments are directed to a system comprising an array of directional microphones used in analyzing directional sounds relative to the user (and relative to the user's gaze direction), and identifying a user's gaze direction and focus distance within a field of view.

Some embodiments include a bone conduction hearing device selectively boosting sound from one or more directions. According to at least one embodiment, the system including the bone conduction hearing device is configured to assist the user to understand the sounds from the surrounding environment. According to one or more embodiments of the present invention, the system uses the bone conduction hearing device configured to aid deaf or hearing-impaired users. The bone conduction hearing device transfers sound by bone vibration directly to a cochlea of the user, bypassing the user's outer and middle ear. Embodiments of the present invention can be extended to other types of cochlear implant hearing devices.

Embodiments of the present invention include a training method, which is used to train the system to understand a direction of sound of interest based on a user's gaze direction. According to at least one embodiment, the method assumes a correlation between a gaze direction of the user and what the user is listening to (e.g., listening to a street performance in an environment include nearby pedestrian and traffic noise).

Embodiments of the present invention can be implemented with smart contact lens. It should be understood that existing contacts leans support microscale components, including for example, single-crystal silicon transistors, radio chips, antennas, diffusion resistors, light emitting diodes (LEDs), silicon photodetectors, etc. These microscale components can be integrated into a contact lens, where the components are encapsulated in biocompatible polymers or the like.

Embodiments of the present invention are extensible to different types of eyewear (e.g., sunglasses, smart-glasses, etc.) and other head mounted devices and garb. For example, in some embodiments, a user's focus is derived based on an orientation of the eyewear frame to one or more sources of sound (e.g., where the system determines if the frame is oriented towards a particular source). That is, according to some embodiments, the array of beamforming microphones, e.g., 211 (see FIG. 2), is pointed substantially in a direction of a view afforded by the frame 210 when worn by a user, for example, disposed across a top bar of the frame 210. It should be understood that the array 211 can be configured to capture a narrow or a wide field of sound relative to a field of view (FOV) of the user. According to one or more embodiments, an eyeglass frame is configured with an array of beamforming microphones (e.g., a circular microphone array including 7 (N) MEMS (micro-electromechanical system) microphones) and a processor (see 16, FIG. 3), and optionally a gaze detection camera 212. The system infers a FOV of the user based on the sounds detected by the microphone array 211, and further detects a gaze direction of the user within the FOV based on the sounds detected by the microphone array 211, for example, by assuming that the gaze direction to be within a small cone (relative to the FOV) extending away from the array 211 and the frame 210 of the eyewear.

Figure 2:
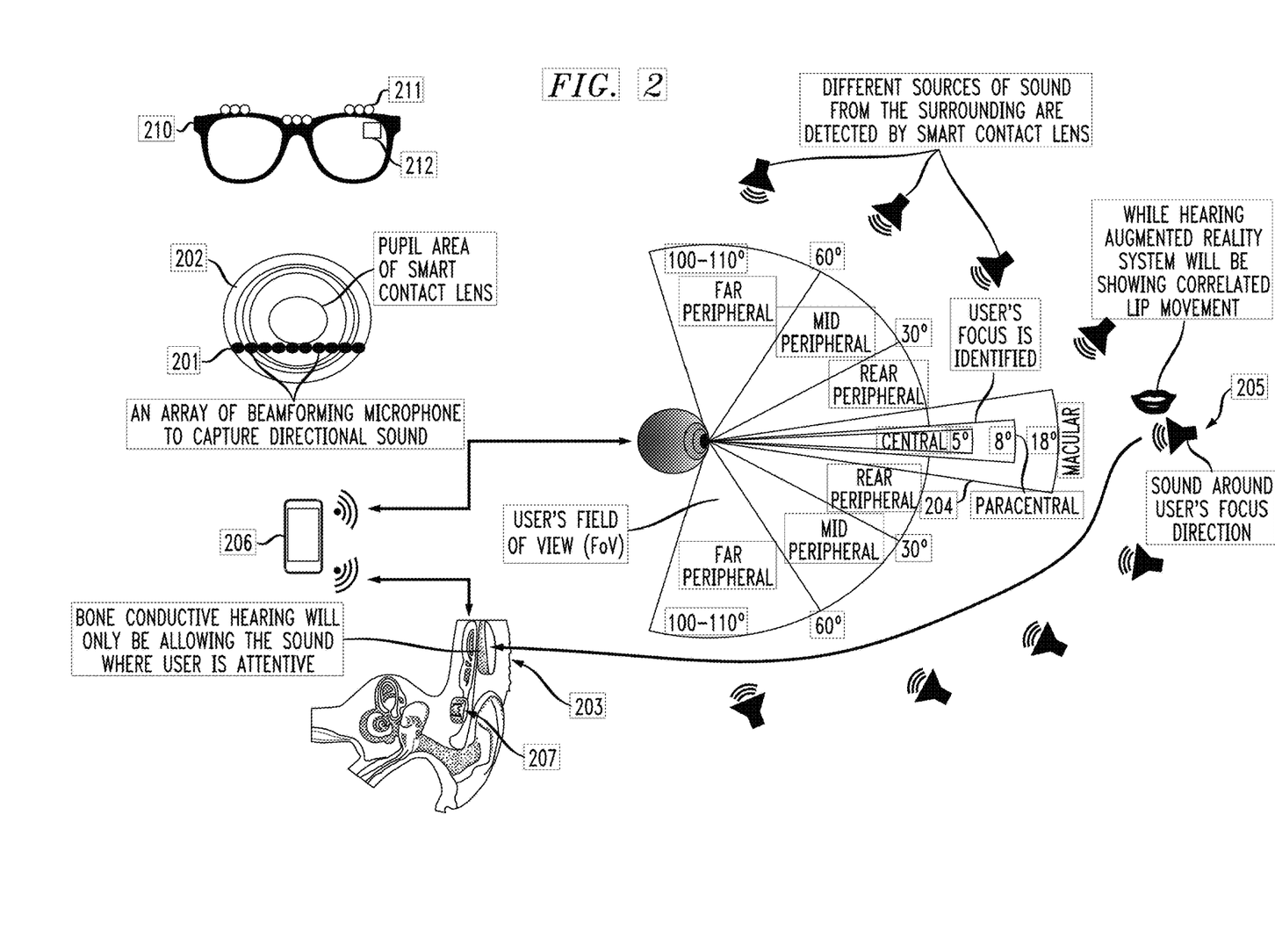
FIG. 2 is a diagram of a hearing assistance system according to embodiments of the present invention.

According to at least one embodiment of the present invention, in a case where the system includes a gaze detection camera 212, the system detects the gaze direction based on the optical theory of spherical surfaces for paraxial rays and the Gullstrand model of the eye to recover 3D centers of the cornea and the pupil based on an image of the user's eye(s) captured by the camera.

According to one or more embodiments of the present invention, the system further determines a direction of one or more sounds within the FOV of the user. Methods for determining direction of sounds are well known and include, for example, a delay-and-sum beamforming technique, which calculates a time delay-of-arrival of sound received at the different microphones relative to the sound arriving at a given microphone and then superimpose time-shifted variants of the N signals.

According to one or more embodiments of the present invention, based on the gaze direction of the user, the device selectively boosts an audio signal of a sounds of interest using the bone conduction hearing device. According to some embodiments of the present invention, a required gaze direction can be determined by processing the audio signals of the microphone array to localize detected sounds (e.g., sound localization in terms of a three-dimensional position, including a horizontal angle, a vertical angle, and a distance (for static sounds) or velocity (for moving sounds)). For example, when a user is looking directly at an object emitting a sound, a delay determined for the sound at each microphone of the array would be substantially equal.

According to one or more embodiments, the required gaze direction can be determined according to properties of the detected sounds (e.g., a loudest sound in the environment, a sound having a frequency range between about 1-3 kilohertz (kHz) corresponding to many alarms, which tend to be located near exits in the case of fire alarms, or a combination of thresholds, such as selecting the loudest sound in the environment for gaze direction unless a sound is detected between 1-3 kHz, etc.). According to some embodiments, the required gaze direction can be determined according to properties of the detected sounds in the environment and a predetermined priority or set of priorities (e.g., the loudest sound, sounds with certain frequencies, sounds with a source approaching the user, sounds corresponding to a particular speaker, etc.) stored by the system, e.g., in the memory of the user's mobile device. Accordingly, the system is configured to assist the user to understand or perceive the sound of interest.

Figure 1:
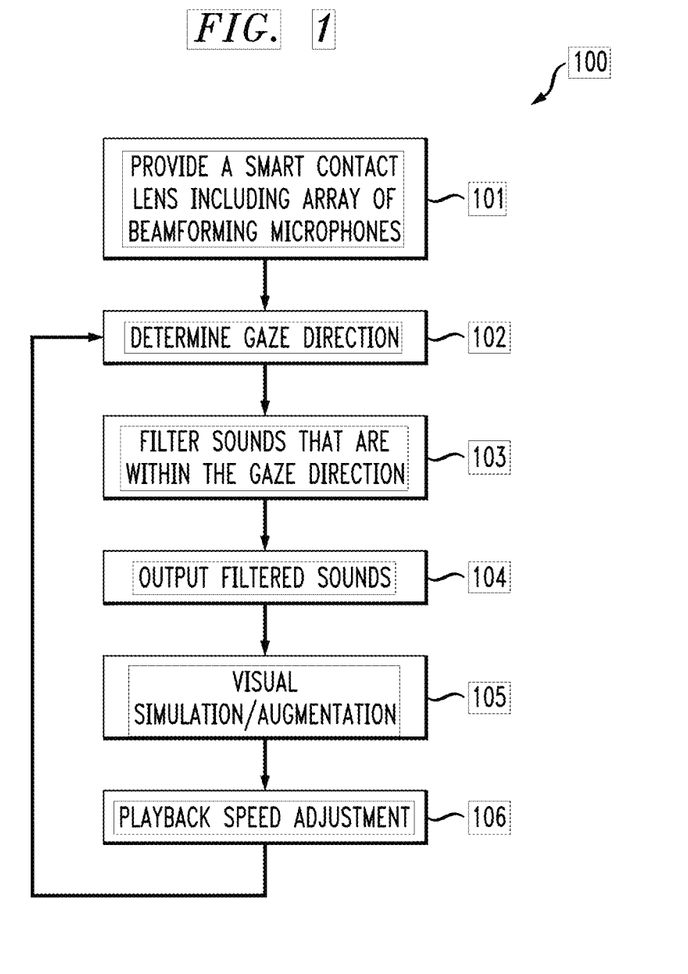
FIG. 1 is a flow diagram of a method operating a hearing assistance system according to embodiments of the present invention.

According to some embodiments of the present invention, a method 100 comprises providing a smart device (e.g., eyewear frames or contact-lens) having an array of beamforming microphones (see FIG. 1, 101). For example, the smart device includes a processor and an array of beamforming microphones disposed on an outer surface of lens, and when the user/wearer of the lens looks at the environs, a gaze direction of the user is determined 102 based on a direction of a sound coming from an area of the FOV of the user. According to at least one embodiment, the FOV is explicitly determined at block 102, for example, the FOV can be determined based on the gaze direction (e.g., a predetermined horizontal arc given the user's point of view, a field measured horizontally, vertically, or diagonally at some distance from the user's point of view, etc.). A computing system selectively filter the sounds that are in a focus of the user based on a determination of gaze direction of the user 103 (e.g., according to properties of the detected sounds in the environment and a predetermined set of priorities for sounds within the gaze direction), and the bone conduction hearing device outputs the filtered sounds 104, and in at least one embodiment the user will not be distracted by the sounds that are not within a focus area of the user.

According to some embodiments of the present invention, an augmented reality capability of a smart contact lens 105 produces appropriate mouth movement simulation or an animated object aligned with a voice the user is listening to (e.g., the filter sounds) through a bone conduction hearing device, so that user may better understand the voice. That is, the smart contact lens 105 can be configured to display an augmented reality image (e.g., adding to the user's existing view of the environment) and includes a contact lens, a display unit in a center region of the contact lens, and a peripheral device (e.g., the microphone array, a near field communication (NFC) antenna, processor, etc.) on the contact lens and around the display unit. According to some embodiments, a microphone of the bone conduction hearing device is controlled by the determination of the FOV of the user.

According to some embodiments of the present invention, the mouth movement simulation or augmentation (e.g., animated object) is aligned with the voice the user is listening to through the bone conduction hearing device in a playback mode 106. In the playback mode a speed of the augmented reality visual and/or filtered sounds is adjusted. For example, the animated object and voice are synchronized at a slowed speed. According to some embodiments, the speed is predetermined. According to at least one embodiment, the speed is selected by the user.

According to some embodiments of the present invention, the smart contact lens is a component of a computing system (e.g., including the smart contact lens and a paired mobile device) that analyzes (at block 103), inter alia, a contextual surrounding, the user's attention towards some activity or subject, a pattern of distraction while performing an activity, etc. Further, the computing system identifies which directional sounds to filter out and which directional sounds are to be transmitted to the user through the bone conduction hearing device.

According to some embodiments of the present invention, the system communicates with one or more internet of things (IoT) devices within a wireless communication range of the computer system, which provide additional information about the sound in the environment, provide additional processing resources, etc. According to one embodiment, the system receives data from an IoT smoke detector that indicates an alarm or notification issued by the smoke detector has priority to other sounds in the environment. It should be understood that the alarm or notification is a sound having a direction relative to the user/system. According to some embodiments, in the absence of data from the IoT devices within the wireless communication range, the system allows ambient sound to be generated by the bone conduction hearing device at a first (e.g., normal) level.

According to at least one embodiment, the smart contact lens includes an antenna, communicating with the bone conduction hearing device to control a level of ambient sound output by the device, where the bone conduction hearing device includes a processor for analyzing the sounds received by the microphone array.

According to some embodiments of the present invention, the computing system analyzes a contextual situation of user's activity, environs, etc. to identify a target focus range of the user (e.g., in a board meeting room) (at block 102), and identify which directional sounds will be output by the bone conduction hearing device (at block 103).

Referring to block 102, according to one or more embodiments of the present invention, a current gaze direction of the user is determined according to the sounds in the environment detected by the array of beamforming microphones. According to some embodiments, the determination of the gaze direction 102 includes the determination of a central portion of the gaze direction (e.g., a 5 degree cone), a paracentral portion of the gaze direction (e.g., an 8 degree cone) and a macular portion of the gaze direction (e.g., an 18 degree cone) as illustrated in FIG. 2. For example, once the central portion of the user's current gaze direction is determined, the paracentral portion, macular portion, etc., can be extrapolated. According to at least one embodiment, the method boosts a sound originating from within one or more of these cones, relative to surrounding areas (e.g., the near peripheral region, mid-peripheral region, etc.).

FIG. 2 illustrates an array of beamforming microphones 201 attached to a smart contact lens 202. Signals received by the microphones 201 are analyzed to determine a direction of incoming sound from the surrounding environs. According to some embodiments, the smart contact lens 202 communicates with a bone conduction hearing device 203 to specify which directional sound needs to be filtered based on the user's focus direction 204 and contextual situation. In addition, the system displays an augmented reality mouth 205 (or an animated object) correlated with the filtered sounds transmitted by the bone conduction hearing device 203 to the user.

According to one or more embodiments of the present invention, the microphones 201 are piezoelectric devices disposed at a perimeter of a contact lens 202 (e.g., outside of the area of the pupil). An array of piezoelectric devices (e.g., strips of devices) can be attached to/formed on/formed in a contact lens substrate. Each piezoelectric device can be mounted on a substrate that is flexible and capable of vibrating upon stimulation of the piezoelectric device, such as a thin polymeric material including, for example, polysilicon materials, silicon on insulator (SOI), or polydimethylsiloxanes (PDMS). In some embodiments, the substrate is a biocompatible material, substantially free or free of metals. The substrate, such as a contact lens, can be in contact with the eye. The piezoelectric devices are configured to sense vibrations (e.g., sounds) in the environment, converting the vibrations to an electric signal. For example, a piezoelectric crystal material produces a net electrical charge when deformed by sound.

According to one or more embodiments, a direction of received sound is identified by the power generation of the piezoelectric devices. For example, the system can compare the power generation of a device on a first side (e.g., right portion) of the contact lens with the power generation of a device on a second side (e.g., left portion) of the contact lens, where the sound direction is determined as being closer to the device having the higher power generation.

According to some embodiments, within the array of microphones 201, different piezoelectric devices have different resonance frequencies, for example, enabling the system to be sensitive to sounds associated with different sources (e.g., to distinguish between sound frequencies associated with conversation and those associated with alarms).

According to one or more embodiments of the present invention, one or more of the piezoelectric devices generate power from mechanical forces applied during the various activities and movements of the wear's eye.

FIG. 2 illustrates the smart contact lens 202 having the array of beamforming microphones 201 attached at an outer surface of the smart contact lens 202 (i.e., away from the eye).

According to some embodiments, the smart contact lens 202 is paired with a mobile device 206 of the user, for example, where the smart contact lens sends wireless signals to the mobile device for analysis and control, for example, of the bone conduction hearing device.

According to some embodiments of the present invention, the bone conduction hearing device 203 is paired with the mobile device 206. According to one or more embodiment, the bone conduction hearing device 203 includes a microphone capturing sounds of the environs.

According to some embodiments of the present invention, the bone conduction hearing device 203 receives the directional sound information from the smart contact lens 202 via the paired mobile device 206. For example, the smart contact lens 202 including the beamforming microphone array transmits a data signal to the paired mobile device 206.

According to some embodiments of the present invention, while the user is exposed to an environment and wants to filter unwanted sounds, the microphones 207 installed with the bone conduction hearing device 203 will be disabled and the system instead uses a signal received by the microphone array 201. According to some embodiments, the bone conduction hear device includes a button or switch to enable/disable options such as the filtering. According to at least one embodiment, in a case where the user wants to listen to sound from the entire surrounding area, all sound captured from the surrounding area is captured and transmitted to the user.

According to one or more embodiments, smart contact lens-based interactions are analyzed to identify that the user should turn attention towards a certain direction while performing an activity. For example, smart contact lens based interactions are analyzed based on sounds received by the microphone array to identify that the users should turn attention towards a certain direction.

According to some embodiments of the present invention, the smart contact lens works based on a contextual surrounding and the user's attention to an activity. Examples of context include, one-to-one conversations, many-to-one conversations, traffic, etc. The user may focus attention to a particular activity, which allows ambient sound in the direction of the activity to be amplified or otherwise preferentially processed by the system.

According to one or more embodiments, the smart contact lens of the user and surrounding devices identify angular directions (based on the processing of the received sounds) where the user needs to keep attention, while performing any activity.

According to some embodiments of the present invention, the smart contact lens identifies the focus angle of the user where the user should keep his focus.

According to some embodiments of the present invention, the beamforming microphones receive sounds individually along with the directional information. According to some embodiments of the present invention, the directional information is sent to the mobile device of the lens user, the mobile device identifies which sounds are out of user's focus or attention.

According to one or more embodiments, the paired mobile device filters the sounds based on direction analysis, and accordingly identifies which sounds are appropriate for the user's attention.

According to one or more embodiments, the mobile device communicates with the bone conduction hearing device to deliver sounds based on a required focus direction of the user (e.g., required based on some sound in the environment such as an alarm or another's voice). According to some embodiments, the user's cognitive state can be considered in determining the required focus direction (e.g., if the user's gaze has not changed in some amount of time, then the system may stimulate the user by calling attention to another direction). The required focus direction can be identified by the system by identifying the user's cognitive state (e.g., from breathing patterns associated with different cognitive states) and a current direction of focus (e.g., is the current direction of focus away from the required focus direction), and identifying which directional sound is to be filtered by bone conductive system. According to some embodiments, based on surrounding IoT data, the system identifies one or more sounds to be amplified, boosted or otherwise prioritized over other sounds. According to at least one embodiment, using cogitative computing the system identifies a target focus range of the user (i.e., a distance between the user and a location of origin of the sound), for example, by a sound localization method, and identifies one or more sounds to be preferentially filtered, e.g., based on acoustic decibel levels of different sounds.

According to one or more embodiments, the user hears sound based on the user's focus area (i.e., the current gaze direction), the smart contact lens identifies the directional sounds and controls what the user hears accordingly.

According to embodiments of the present invention, the mobile device analyzes the sound from the entire environs, and identifies if any other directional sound is also determined to have priority, for example, an alarm, siren, an approaching sound, a sound approaching at an increasing velocity, etc.

According to embodiments of the present invention, the mobile device analyzes the sounds received by the microphone array, and allows (i.e., filters) one or more of the sounds to be transmitted to and/or by the bone conduction hearing device.

According to one or more embodiments, the system identifies the user's current focus and required attention using the array of beamforming microphones.

According to some embodiments of the present invention, the system analyzes a sensed speech pattern (of the sound received by the microphone array), and is configured to display an augmented view with synchronized lip/mouth movements. According to at least one embodiment, the system is able to detect or identify different speakers by known speech separation techniques, and can attach priorities to the speakers, such that the user's attention is directed to the speaker or speakers within a current gaze direction and having a relatively high priority in order to help isolate a speaker voice in an environment and overcome the cocktail party effect.

According to some embodiments of the present invention, when the user is listening to selective directional sound output by the bone conduction hearing device, and there is an ambiguity in the sound, the system displays or projects synchronized mouth (e.g., augmented reality) using an external display (e.g., of mobile device 206), light generated by light emitting diodes of a smart contact lens and synchronized to the filtered sound, etc. According to one or more embodiments, the augmented reality object (e.g., mouth or light) is a visual aid that helps the user to understand what is being heard.

According to embodiments of the present invention, the mouth movement simulation or animated object aligned with the sound (e.g., voice) the user is listening to with the bone conduction method can be controlled with the playback mode. According to embodiments of the present invention, in the playback mode, the user can adjust the speed of playback so that the animated object and voice synchronize are played at a comfortable speed (i.e., for the user).

Recapitulation:

According to one or more embodiments of the present invention, a method includes providing a smart contact lens including an array of beamforming microphones (101), wherein the smart contact lens is worn by a user and the array of beamforming microphones receive sound from different directions, determining a gaze direction of the user (102), filter the sound received by the array of beamforming microphones based on the gaze direction of the user to determine filtered sound (103), and output the filtered sound via a bone conduction hearing device (104).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 3:
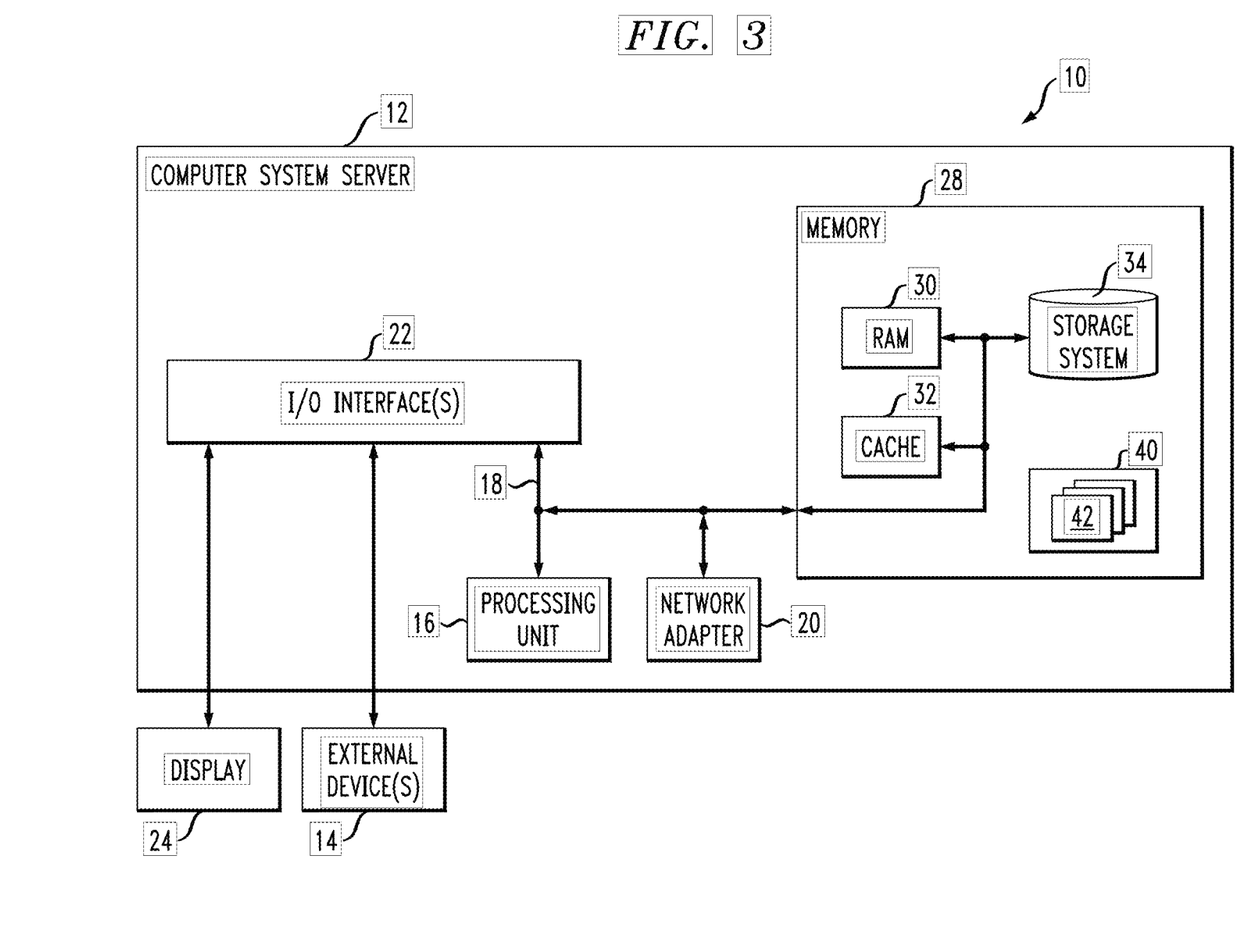
FIG. 3 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 3 depicts a computer system that may be useful in implementing one or more aspects and/or elements of the invention, also representative of a cloud computing node according to an embodiment of the present invention. Referring now to FIG. 3, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 3, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 3) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
providing a smart contact lens comprising an array of beamforming microphones, wherein the smart contact lens is worn by a user and the array of beamforming microphones receive sound from different directions;
determining a gaze direction of the user;
filter the sound received by the array of beamforming microphones based on the gaze direction of the user to determine filtered sound; and
output the filtered sound via a bone conduction hearing device.

2. The method of claim 1, wherein the gaze direction of the user is determined based on sound localization of the sound received by the array of beamforming microphones.

3. The method of claim 1, further comprising displaying a visual simulation synchronized to the filtered sound.

4. The method of claim 3, further comprising changing a playback speed of the filtered sound and the visual simulation.

5. The method of claim 3, wherein the visual simulation is displayed by the smart contact lens.

6. The method of claim 3, wherein the visual simulation is displayed on an external display.

7. The method of claim 1, further comprising displaying a visual augmentation synchronized to the filtered sound.

8. The method of claim 5, further comprising changing a playback speed of the filtered sound and the visual augmentation.

9. The method of claim 5, wherein the visual augmentation is displayed by the smart contact lens.

10. The method of claim 5, wherein the visual augmentation is displayed on an external display.

11. A non-transitory computer readable storage medium comprising computer executable instructions which when executed by a computer cause the computer to perform a method of filtering sounds, the method comprising:
providing a smart contact lens comprising an array of beamforming microphones, wherein the smart contact lens is worn by a user and the array of beamforming microphones receive sound from different directions;
determining a gaze direction of the user;
filter the sound received by the array of beamforming microphones based on the gaze direction of the user to determine filtered sound; and output the filtered sound via a bone conduction hearing device.

12. The non-transitory computer readable storage medium of claim 11, wherein the gaze direction of the user is determined based on sound localization of the sound received by the array of beamforming microphones.

13. The non-transitory computer readable storage medium of claim 11, further comprising displaying a visual simulation or augmentation synchronized to the filtered sound, wherein the visual simulation or augmentation is displayed by at least one of the smart contact lens and an external display.

14. The non-transitory computer readable storage medium of claim 13, further comprising changing a playback speed of the filtered sound and the visual simulation.

15. A system comprising:
an array of beamforming microphones disposed on a contact lens;
a processor in electronic communication with the array of beamforming microphones and configured to determine a direction of a plurality of sounds received by the array of beamforming microphones, determine a focus on a first sound of the sounds based on the directions of sounds relative to an orientation of the array of beamforming microphones, and output a signal based on the focus;
an audio output device configured to receive the signal output by the processor and to output a filtered audio, the filtered audio preferentially treating the first sound received by the array of beamforming microphones based on the signal output by the processor; and
a mobile device including the processor and paired with the array of beamforming microphones.

16. The system of claim 15, wherein the mobile device is paired with the audio output device.

17. The system of claim 15, wherein the array of beamforming microphones is oriented substantially in a direction of a view afforded by the contact lens when worn by a user and toward a source the first sound.

18. The system of claim 15, wherein the mobile device comprises the audio output device.

19. The system of claim 15, wherein the mobile device including the processor is configured to detect a predetermined sound having a priority greater than the first sound,
wherein the processor is configured to preferentially treat the predetermined sound over the first sound,
wherein the system further comprises a memory accessible to the processor and storing a set of priorities for predetermined sounds, including the predetermined sound.

* * * * *